(12) United States Patent
Dunne et al.

(10) Patent No.: US 11,222,059 B2
(45) Date of Patent: *Jan. 11, 2022

(54) DATA CLUSTERING

(71) Applicant: International Business Machines Corporation, Armonk, NY (US)

(72) Inventors: Jonathan Dunne, Dungarvan (IE); Andrew T. Penrose, Castleknock (IE)

(73) Assignee: International Business Machines Corporation, Armonk, NY (US)

( * ) Notice: Subject to any disclaimer, the term of this patent is extended or adjusted under 35 U.S.C. 154(b) by 401 days.

This patent is subject to a terminal disclaimer.

(21) Appl. No.: 16/400,101

(22) Filed: May 1, 2019

(65) Prior Publication Data

US 2019/0258661 A1    Aug. 22, 2019

Related U.S. Application Data

(63) Continuation of application No. 15/788,098, filed on Oct. 19, 2017, now Pat. No. 10,635,703.

(51) Int. Cl.
| | |
|---|---|
| *G06F 16/35* | (2019.01) |
| *G06K 9/62* | (2006.01) |
| *G06F 16/28* | (2019.01) |
| *G06F 16/26* | (2019.01) |

(52) U.S. Cl.
CPC .......... *G06F 16/355* (2019.01); *G06F 16/285* (2019.01); *G06K 9/6221* (2013.01); *G06F 16/26* (2019.01)

(58) Field of Classification Search
CPC .... G06F 16/285; G06F 16/355; G06F 16/353; G06K 9/6221
See application file for complete search history.

(56) References Cited

U.S. PATENT DOCUMENTS

| | | | |
|---|---|---|---|
| 6,393,460 B1 | 5/2002 | Gruen et al. | |
| 6,654,739 B1 | 11/2003 | Apte et al. | |
| 6,727,916 B1 | 4/2004 | Ballard | |
| 7,219,089 B2 | 5/2007 | Kobayashi et al. | |

(Continued)

FOREIGN PATENT DOCUMENTS

| | | |
|---|---|---|
| CN | 103401712 A | 11/2013 |
| EP | 1271341 A2 | 1/2003 |

(Continued)

OTHER PUBLICATIONS

Kucukyilmaz et al., "Chat Mining: Predicting User and Message Attributes in Computer-Mediated Communication", 2008, Information Processing & Management, Bilkent University, Computer Engineering Department, 38 pages. https://pdfs.semanticscholar.org/647f/924c452d7c558a82fca7fd09b922aeab9265.pdf.

(Continued)

*Primary Examiner* — Merilyn P Nguyen
(74) *Attorney, Agent, or Firm* — Stosch S. Sabo (57) ABSTRACT

A set of data comprising heterogeneous data is processed in accordance with a data clustering algorithm so as to obtain an initial data cluster comprising homogeneous data. A supervised data cluster generated based on a human analysis of the set of data is obtained and compared with the initial data cluster to obtain a comparison result. The data clustering algorithm is modified based on the comparison result.

13 Claims, 6 Drawing Sheets

(56) References Cited

U.S. PATENT DOCUMENTS

| | | | |
|---|---|---|---|
| 7,251,696 B1 | 7/2007 | Horvitz | |
| 7,308,451 B1 | 12/2007 | Lamping et al. | |
| 7,469,246 B1 | 12/2008 | Lamping | |
| 7,706,523 B2 | 4/2010 | Agusta | |
| 7,945,600 B1* | 5/2011 | Thomas | G06F 16/353 707/804 |
| 8,010,534 B2* | 8/2011 | Roitblat | G06F 16/35 707/742 |
| 8,055,592 B2 | 11/2011 | Boyle et al. | |
| 8,145,677 B2* | 3/2012 | Al-Shameri | G06F 16/3347 707/802 |
| 8,190,999 B2 | 5/2012 | Chen et al. | |
| 8,539,359 B2 | 9/2013 | Rapaport et al. | |
| 8,788,701 B1 | 7/2014 | Byrnes et al. | |
| 8,972,868 B2 | 3/2015 | Schubert | |
| 8,990,189 B2 | 3/2015 | Kennedy | |
| 9,135,242 B1 | 9/2015 | Wang et al. | |
| 9,288,166 B2 | 3/2016 | Scherpa et al. | |
| 2002/0042793 A1 | 4/2002 | Choi | |
| 2003/0005258 A1* | 1/2003 | Modha | G06K 9/6228 712/1 |
| 2004/0059736 A1 | 3/2004 | Willse et al. | |
| 2004/0111479 A1 | 10/2004 | Borden et al. | |
| 2005/0234972 A1* | 10/2005 | Zeng | G06F 16/951 |
| 2006/0004911 A1 | 1/2006 | Becker | |
| 2008/0114800 A1* | 5/2008 | Gazen | G06F 16/95 |
| 2008/0294686 A1* | 11/2008 | Long | G06K 9/6224 |
| 2009/0006377 A1 | 1/2009 | Kobayashi et al. | |
| 2009/0055359 A1 | 2/2009 | Gross | |
| 2009/0222551 A1 | 9/2009 | Neely | |
| 2010/0174577 A1 | 7/2010 | Duffy | |
| 2010/0205541 A1 | 8/2010 | Rapaport et al. | |
| 2011/0035379 A1* | 2/2011 | Chen | G06K 9/6226 707/740 |
| 2011/0295903 A1 | 12/2011 | Chen | |
| 2012/0240062 A1 | 9/2012 | Passmore et al. | |
| 2013/0151525 A1 | 6/2013 | Ankan et al. | |
| 2013/0273976 A1 | 10/2013 | Rao et al. | |
| 2014/0129510 A1 | 5/2014 | Vladislav et al. | |
| 2014/0188536 A1 | 7/2014 | Dasgupta | |
| 2014/0278633 A1 | 9/2014 | Daly | |
| 2015/0254331 A1* | 9/2015 | Long | G06N 7/005 707/737 |
| 2016/0232241 A1 | 8/2016 | Stoyanov et al. | |
| 2016/0277574 A1 | 9/2016 | Ristock | |
| 2017/0293543 A1* | 10/2017 | Xu | G06F 11/008 |
| 2018/0285086 A1 | 10/2018 | O'Malley | |
| 2018/0293505 A1 | 10/2018 | Bouveyron et al. | |
| 2018/0336207 A1 | 11/2018 | Dunne et al. | |
| 2019/0121868 A1 | 4/2019 | Dunne et al. | |

FOREIGN PATENT DOCUMENTS

| | | |
|---|---|---|
| WO | 02093414 A1 | 11/2002 |
| WO | 2014022837 A1 | 2/2014 |
| WO | 2018210440 A1 | 11/2018 |

OTHER PUBLICATIONS

Mayfield et al., "Hierarchical Conversation Structure Prediction in Multi-Party Chat", Proceedings of the 13th Annual Meeting of the Special Interest Group on Discourse and Dialogue, Jul. 2012, Copyright 2012 Association for Computational Linguistics, 10 pages.

Ramachandran et al., "Untangling Topic Threads in Chat-Based Communication: A Case Study", Analyzing Microtext: Papers from the 2011 AAAI Workshop (WS-11-05), Copyright © 2011, Association for the Advancement of Artificial Intelligence (www.aaai.org), 6 pages.

"Dijkstra's algorithm", Wikipedia, https://en.wikipedia.org/wiki/Dijkstra's_algorithm, printed Sep. 10, 2017, 8 pages.

Elsner et al., "Disentangling Chat", Computational Linguistics, vol. 36, No. 3, accepted for publication: Mar. 3, 2010, © 2010 Association for Computational Linguistics, 22 pages.

Elsner, "Chat Disentanglement", printed Sep. 10, 2017, http://www.ling.ohio-state.edu/%7Eelsner.14/resources/chat-manual.html, 5 pages.

Wang et al., "Context-based Message Expansion for Disentaglement of Interleaved Text Conversations", Human Language Technologies: The 2009 Annual Conference of the North American Chapter of the ACL, pp. 200-208, Jun. 2009.

Wikipedia, "Latent Dirichlet allocation", http://en.wikipedia.org/wiki/Latent_Dirichlet_allocation, printed May 16, 2017, pp. 1-7.

Wikipedia, "Markov chain Monte Carlo", http://en.wikipedia.org/wiki/Markov_chain_Monte_Carlo, printed May 16, 2017, pp. 1-7.

Elsner et al., "Disentangling Chat with Local Coherence Models", Proceedings of the 49th Annual Meeting of the Association for Computational Linguistics, Jun. 19-24, 2011, pp. 1179-1189.

IBM, "IBM Sametime", http://www-03.ibm.com/software/products/en/ibmsame, printed May 16, 2017, pp. 1-2.

Catchup-Slack, https://slack.com/apps/A128G55NW-catchup, printed May 16, 2017, pp. 1-2.

Manning, "Last Words—Computational Linguistics and Deep Learning", 2015 Association for Computational Linguistics, doi: 10.1162/COLI_a_00239, https://en.wikipedia.org/wiki/Dijkstra's_algorithm, pp. 1-7.

Mell et al., "The NIST Definition of Cloud Computing", National Institute of Standards and Technology, Special Publication 800-145, Sep. 2011, 7 pages.

Croup Chat-Clinked, "Group Chat", https://clinked.com/features/group-chat/, printed May 16, 2017, pp. 1-4.

Anonymous, "Determining Relevant Contributor Potential to Ongoing Instant Messaging Interactions," An IP.com Prior Art Database Technical Disclosure, Oct. 15, 2015, p. 1-4, IP.com No. IPCOM000243735D.

Blei et al., "Latent Dirichlet Allocation," Journal of Machine Learning Research, 2003, p. 993-1022, vol. 3.

IBM, "System and Method for Text Based Routing and Prioritization of Support Queries," An IP.com Prior Art Database Technical Disclosure, May 30, 2008, p. 1-3, IP.com No. IPCOM000171148D.

Shen et al., "Multi-Criteria Task Assignment in Workflow Management Systems," Proceedings of the 36th Annual Hawaii International Conference on System Sciences (HICSS'03), 2003, 9 Pages, IEEE Computer Society.

Pending Patent Application No. EP2017/082335, entitled "Improved Data Clustering", Filed Dec. 12, 2017, 48 Pages.

International Search Report, International Application No. PCT/EP2017/082335, International Filing Date Dec. 12, 2017, dated Mar. 13, 2018, 11 Pages.

IBM, List of IBM Patents or Patent Applications Treated as Related, Apr. 30, 2019, 2 pages.

* cited by examiner

DATA CLUSTERING

BACKGROUND

Data clustering aims to identify and create data clusters comprising homogenous data (e.g. data of the same type or format, or data relating to a single topic or theme) from a collection of unstructured data which comprises heterogeneous data (e.g. data of multiple types or formats, or data relating to multiple topics or themes).

SUMMARY

Aspects of the present disclosure are directed toward a computer-implemented method comprising processing a set of data comprising heterogeneous data in accordance with a data clustering algorithm so as to obtain an initial data cluster comprising homogeneous data, where the set of data comprises a plurality of documents, where each document is represented by a vector of words and associated with a point in time, and where the processing further comprises dividing the plurality of documents into data bundles, analyzing the data bundles to identify data similarity, and redefining the plurality of documents based on identified data similarity. The method can further comprise obtaining a supervised data cluster generated based on a human analysis of the set of data. The method can further comprise comparing the initial data cluster and the supervised data cluster to obtain a comparison result. The method can further comprise modifying the data clustering algorithm based on the comparison result. The method can further comprise processing the set of data in accordance with the modified data clustering algorithm so as to obtain a refined data cluster comprising homogeneous data.

Further aspects of the present disclosure are directed toward a system comprising a processor and a tangible, computer-readable memory for storing program instructions which, when executed by the processor, cause the processor to perform a method comprising processing a set of data comprising heterogeneous data in accordance with a data clustering algorithm so as to obtain an initial data cluster comprising homogeneous data, where the set of data comprises a plurality of documents, where each document is represented by a vector of words and associated with a point in time, and where the processing further comprises dividing the plurality of documents into data bundles, analyzing the data bundles to identify data similarity, and redefining the plurality of documents based on identified data similarity. The processor can perform a method further comprising obtaining a supervised data cluster generated based on a human analysis of the set of data. The processor can perform a method further comprising comparing the initial data cluster and the supervised data cluster to obtain a comparison result. The processor can perform a method further comprising modifying the data clustering algorithm based on the comparison result. The processor can perform a method further comprising processing the set of data in accordance with the modified data clustering algorithm so as to obtain a refined data cluster comprising homogeneous data.

Further aspects of the present disclosure are directed toward a computer program product comprising a computer readable storage medium having program instructions embodied therewith. The program instructions can be executed by a processing unit to cause the processing unit to perform a method comprising processing a set of data comprising heterogeneous data in accordance with a data clustering algorithm so as to obtain an initial data cluster comprising homogeneous data. The processing unit can perform a method further comprising obtaining a supervised data cluster generated based on a human analysis of the set of data. The processing unit can perform a method further comprising comparing the initial data cluster and the supervised data cluster to obtain a comparison result. The processing unit can perform a method further comprising modifying the data clustering algorithm based on the comparison result.

The above summary is not intended to describe each illustrated embodiment or every implementation of the present disclosure.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Data clustering may be useful for numerous applications, such as in document management and retrieval. For instance, processes for disentangling interleaved messages or communications, which are exchanged in a chat messaging system or the like, may use topic analysis to identify a subset of messages that form part of a common conversation relating to a particular topic or theme over a period of time. In another example, so-called "catch-up" services for users of chat messaging systems or the like may use topic analysis for identifying a subset of messages relating to a particular user-selected topic or theme, and provide the identified messages to the user for review at a later time. Such applications benefit from the restructuring (e.g. clustering) of otherwise chronologically-ordered and intertwined messages into clusters (e.g. groups) of similar and/or related messages. In yet another example, a collection of unstructured data or text may require classification into certain type or formats.

However, conventional data clustering techniques are resource intensive and may lead to inaccurate and imprecise results. There remains a concern that known approaches may not be optimal due to the number of analysis iterations required and/or unnecessary amounts of power, communication, processing and storage resources employed.

Embodiments described herein enable enhanced data clustering or disentanglement which employs supervised learning methods. Embodiments may thus provide advanced supervised learning than can be combined with a base algorithm to improve the efficiency and/or accuracy of the base algorithm. While learning modules may be added to an iterative process to automate a disentanglement process, embodiments may ensure that, if a learning system diverges from an initial disentanglement, there are entry points for supplemental supervision to expedite the learning process.

Embodiments may be employed in conjunction with conventional data clustering or data disentangling concepts that are undertaken automatically using machines. For example, by making a comparison between machine-obtained and human-obtained results, errors and/or improvements in the machine-obtained results may be identified. Such identified errors and/or improvements may be used to modify (e.g. refine or improve) the data clustering or data disentangling concepts that are undertaken automatically (e.g. the machine-based algorithm), thereby providing improved and/or more accurate data clustering or data disentangling algorithms.

Purely by way of example, given an instance relating to chat disentanglement, proposed embodiments may implement the following: (i) analyze chat text to determine topic terms, groups and level of entanglement; (ii) employ one or more existing algorithms to disentangle chats based on a topic; (iii) obtain a supervised input that is then used to correct 1st and nth order entanglement errors; (iv) derive one or more disentanglement matrices to determine correction mappings; and (v) apply the disentanglement matrices to subsequent text corpus to improve disentanglement. The derived disentanglement matrices (e.g. which may result from the combined learning effort) may be used to formulate correction mappings. The mappings may be subsequently applied to similar text corpora to aid disentanglement/data-clustering and/or improve learning speed.

Whereas existing or conventional data clustering approaches may fall short of requirements, proposed embodiments may employ human supervision concepts for improving the accuracy and efficiency of data clustering. By comparing results from human analysis of data with results obtained using an automated clustering algorithm, refinements in the algorithm may be identified and then implemented in relation to subsequent executions of the algorithm. Proposed embodiments may thus comprise the additional step of processing the set of data in accordance with the modified data clustering algorithm so as to obtain a refined data cluster comprising homogeneous data.

Proposed embodiments may enable data (such as documents, communications, and messages) to be structured in groups according to redefined clusters, thereby enabling more accurate retrieval of relevant data for provision to a user with improved efficiency. By communicating more precise data clusters to a user, the use of power, as well as communication, processing and storage resources of the user's device and communication network may be minimized or reduced by proposed embodiments.

In an embodiment, the comparison result may comprise one or more data clustering data structures. For example, the one or more data clustering data structures may comprise a matrix (which may be referred to as a 'disentanglement matrix') or vector. For instance, a comparison of the initial data cluster and the supervised data cluster may identify disentanglement errors and, from such errors, disentanglement matrices may be derived for determining correction mappings. Such disentanglement matrices may be applied to subsequent data corpus to improve data clustering and learning velocity.

Furthermore, the one or more data clustering data structures may be generated based on at least one of: the set of data; the initial data cluster; the supervised data cluster; and a signal representative of a human analysis of comparison of the initial data cluster and the supervised data cluster. For example, disentanglement matrices may be derived for domain specific chat corpora, and, through analysis of domain specific corpora, additional improvements can be made to learning outcomes.

In some embodiments, the data clustering algorithm may be based on one or more data clustering parameters. Modifying the data clustering algorithm may thus comprise modifying the one or more data clustering parameters based on the comparison result. For instance, the data clustering algorithm may employ parameters 'a' and 'b', and the parameters 'a' and 'b' may be modified based on a result of human analysis of the set of data, thereby improving the data clustering algorithm.

The set of data may comprise a set of communications or documents. Processing the set of data in accordance with a data clustering algorithm may then comprise: dividing the communications or documents into data bundles; analyzing the data bundles to identify data similarity; and redefining the communications or documents based on identified data similarity. By identifying patterns indicative of topic convergence or topic drift, it may be possible to redefine the communication/document clusters, and/or reorder communications/documents within clusters, thus forming more homogenous clusters.

By way of example, where each communication or document is represented by a vector of words and associated with a point in time, processing the set of data in accordance with a data clustering algorithm may comprise: dividing the communications or documents into first time slices using a first time interval to form a plurality of consecutive sets of documents; sub-dividing each set of documents into one or more second time slices using respective second time intervals so as to form one or more subsets of documents; analyzing the documents in each set and subset of documents to identify a plurality of topics, each topic being represented by a set of most relevant topic keywords; clustering the documents in each set and subset of documents according to topic; comparing the topics from different sets and subsets of documents to identify patterns of changes in the relevance of topic keywords over time; and redefining the document clusters to form more homogenous clusters based on the identified patterns.

Furthermore, sub-dividing each set of documents into one or more second time slices may comprise sub-dividing each set of documents into two or more consecutive overlapping time slices. In an example implementation, a start time of each second time slice may be later than the start time of the corresponding first time slice by an offset time period, wherein the offset time period increases for each consecutive overlapping second time slice. By identifying the topics for overlapping time slices that are consecutive in time, and thus which include at least some of the same messages, it may be possible to infer how the topics change over time.

Also, comparing the topics from different sets and subsets of documents to identify patterns of changes in the relevance of topic keywords over time may comprise analyzing the topics from different sets and subsets of documents of overlapping time slices to identify patterns of changes in the relevance of topic keywords over time.

In an embodiment, comparing the topics from different sets and subsets of documents to identify patterns of changes in the relevance of topic keywords over time may comprise: determining delta differences between relevance scores of topic keywords of topics from sets and subsets of documents of consecutive overlapping time slices, and using the delta differences to identify patterns of changes selected from the group consisting of: increasing relevance of one or more topic keywords represented in multiple different topics over time, indicative of topic convergence, and decreasing relevance of one or more topic keywords represented in a particular individual topic over time, indicative of topic drift. For instance, a pattern of increasing relevance of one or more topic keywords represented in multiple different topics over time may be identified, indicative of topic convergence. A pattern of decreasing relevance of one or more topic keywords represented in a particular individual topic over time may be identified, indicative of topic drift.

By way of example, analyzing the data bundles may comprise performing data analysis on the communications or documents, the data analysis using Latent Dirichlet Allocation for maximum likelihood fit to identify a predefined number of data types, wherein each data type is represented by a set of most relevant data formats and each data format has an associated likelihood score indicative of relevance of the format. Proposed embodiments may thus employ a known or conventional algorithm which may be improved via learning based on human analysis/supervision.

It should be understood that the Figures are merely schematic and are not drawn to scale. It should also be understood that the same reference numerals are used throughout the Figures to indicate the same or similar parts.

In the context of the present application, a system may be a single device or a collection of distributed devices that are adapted to execute one or more embodiments described herein. For instance, a system may be a personal computer (PC), a server or a collection of PCs and/or servers connected via a network such as a local area network, the Internet and so on to cooperatively execute at least one embodiment.

Embodiments described herein enable proactive supervised learning which can be implemented to improve a base data clustering algorithm. By comparing results from human analysis of a set of data with results from a base data clustering algorithm executed on the set of data, errors or shortcomings of the base data clustering algorithm may be identified and then mitigated (e.g. via modification of the base data clustering algorithm). In this way, proposed embodiments may reduce a number of learning cycles required to reach an optimal learned state for the clustering algorithm.

Thus, embodiments described herein can overcome shortcomings of conventional learning approaches by ensuring that if a learning system diverges from an initial disentanglement there are entry points for supplemental supervision to expedite the learning process.

Accordingly, there is provided an approach to improve or refine data clustering algorithms based on human supervision and/or human analysis of data (source data and/or result data). Concepts for improving data clustering through extrapolating and/or inferring data clustering improvements based on human feedback may thus be provided.

Embodiments described herein also provide concepts for the clustering or disentangling of data that facilitate the efficient organization, presentation and/or retrieval of data from a repository of unstructured or intertwined data.

Also, it is noted that, although embodiments are presented in the context of being applicable in the relation to disentanglement of communications or messages, applicability of the proposed concepts may extend to other fields or types of data where the data has a degree of heterogeneous data which is unstructured, intertwined and/or disorganized. For example, embodiments may be implemented in relation to unstructured text that requires classification into given types.

Illustrative embodiments may therefore provide concepts for clustering or grouping of unstructured data. Dynamic and/or human supervised data clustering concepts may therefore be provided by proposed embodiments.

Modifications and additional steps to a traditional data processing, storage and/or retrieval systems may also be proposed which may enhance the value and utility of the proposed concepts.

As the skilled person will appreciate, clustering involves organizing a set of data objects into groups, called "clusters", whose members are similar in some way. A cluster may therefore be a group of data objects which are similar to each other, and which are dissimilar from data objects in other groups or clusters. Typically, a cluster comprises a group of data objects that are associated with the cluster, and similarity between the data objects is represented by a set of representative members or features of the cluster. In the case of topic clusters for example, the members or features of the data objects are words, and each topic has a set of representative topic keywords, as described further below. As the skilled person will also appreciate, each data object may be associated with more than one cluster.

Figure 1:
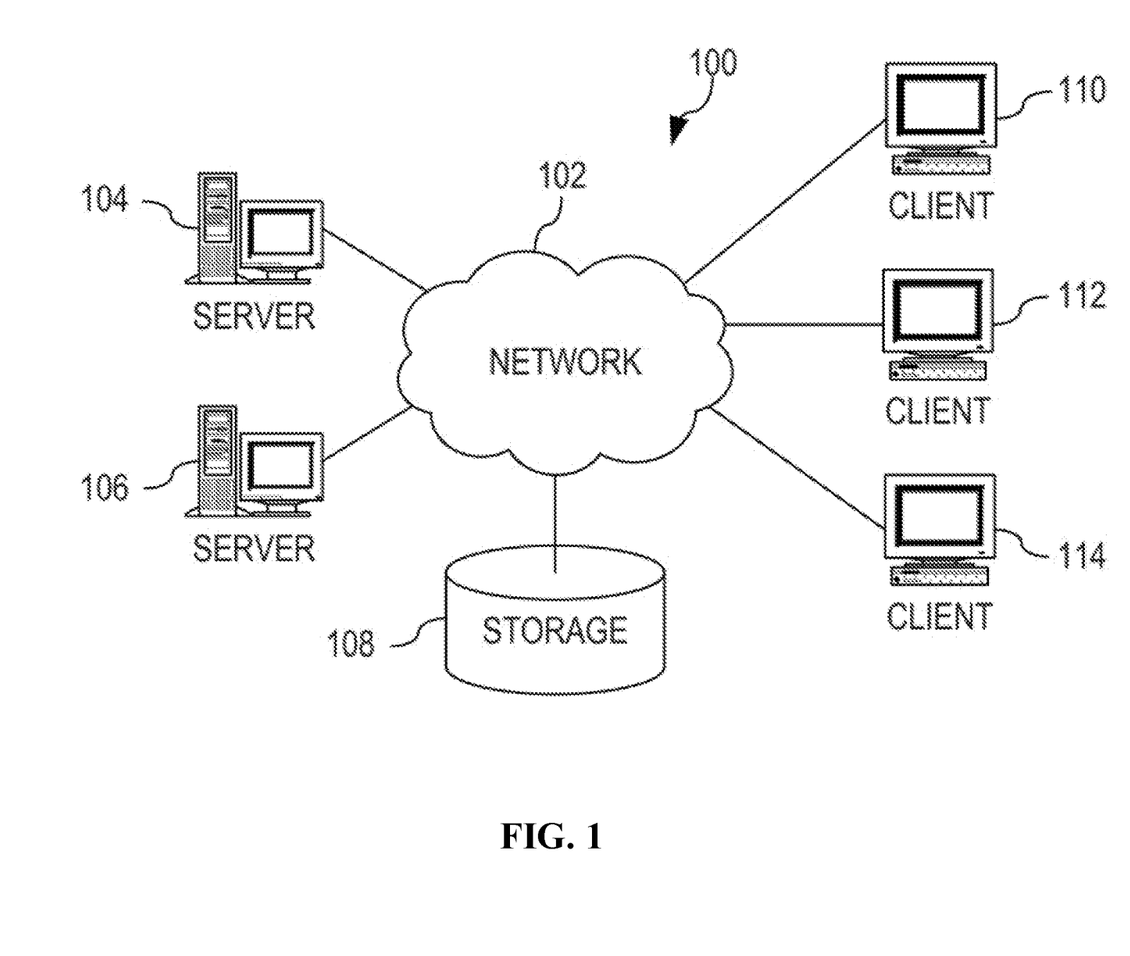
FIG. 1 depicts a pictorial representation of an example distributed system in which aspects of the illustrative embodiments may be implemented.

FIG. 1 depicts a pictorial representation of an example distributed data processing system in which aspects of the illustrative embodiments may be implemented. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first 104 and second 106 servers are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the network 102 represents a worldwide collection of networks and gateways that use the Transmission Control Protocol/Internet Protocol (TCP/IP) suite of protocols to communicate with one another (e.g. the Internet). At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments, and therefore, the particular elements shown in FIG. 1 should not be considered limiting with regard to the environments in which the illustrative embodiments may be implemented.

Figure 2:
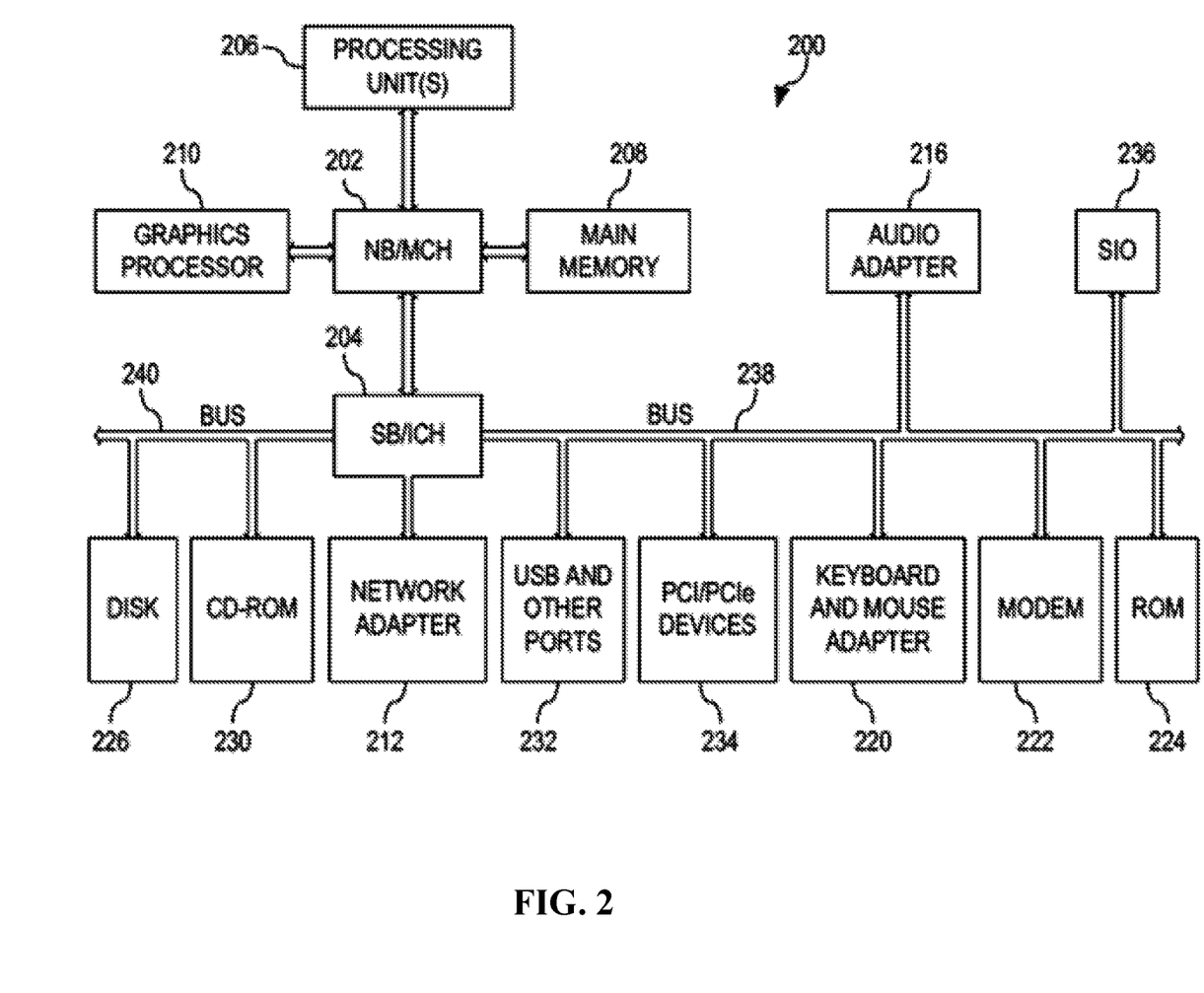
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments are performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

A proposed concept may enhance a data clustering process through human-supervision and machine learning. Examples may perform data clustering multiple times using sets and/subsets of data. In example implementations, the sets and/or subsets of data may be overlapping. Analysis of the discovered data similarities for changes over time may identify patterns of increasing and/or decreasing relevance over time. The patterns may then be used to determine more precise data bundles. In this way, the data may be structured or grouped with improved precision.

Figure 3:
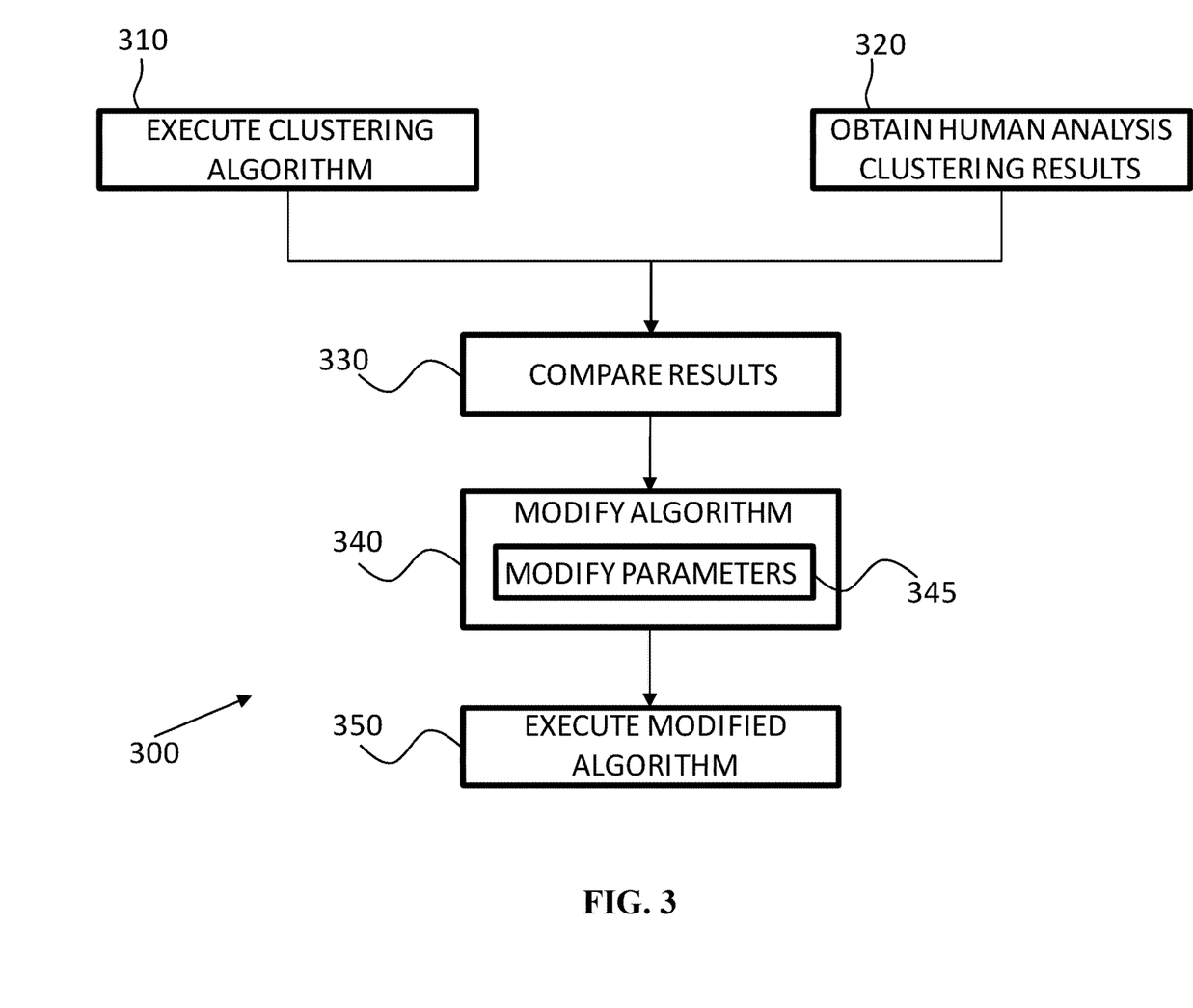
FIG. 3 is a flow diagram of a computer-implemented method 300 for data clustering according to some embodiments.

Referring now to FIG. 3, there is depicted a flow diagram of a computer-implemented method 300 for data clustering according to an embodiment.

At block 310, a set of data comprising heterogeneous data is processed in accordance with a data clustering algorithm so as to obtain an initial data cluster comprising homogeneous data. An example clustering algorithm is described in more detail below with respect to FIG. 4. However, it is to be understood that other clustering algorithms can be used in other embodiments.

The set of data can comprise, for example, a set of communications (such as electronic mail or text messages, for example) or documents (such as transcripts or written articles) in electronic format.

Also, processing the set of data in accordance with a data clustering algorithm comprises: dividing the communications or documents into data bundles; analyzing the data bundles to identify data similarity; and redefining the communications or documents based on identified data similarity. For instance, analyzing the data bundles may comprise performing data analysis on the communications or documents, wherein the data analysis uses Latent Dirichlet Allocation for maximum likelihood fit to identify a predefined number of data types for example, and wherein each data type may be represented by a set of most relevant data formats and each data format has an associated likelihood score indicative of relevance of the format.

It will thus be appreciated that, as a result of processing the set of data with a data clustering algorithm at block 310, one or more initial data clusters comprising homogenous data may be obtained.

At block 320 (which may be performed before, after or during execution of block 310 for example), there is obtained a supervised data cluster which has been generated based on a human analysis of the set of data. In other words, a supervised data cluster which has been generated by a human (e.g. supervisor) performing analysis of the set of data is acquired. For example, the supervised data cluster may be a data cluster that has been generated by a user reviewing the set of data and then extracting some of the data so as to form a data cluster comprising homogenous data (as perceived/identified by the user). In another example, the supervised data cluster may be formed based on a user marking (e.g. flagging or highlighting) data of a set of data so as to indicate that the marked data is of a common (e.g. similar or same type/format).

At block 330, the initial data cluster and the supervised data cluster are compared to obtain a comparison result. Here, the comparison result comprises one or more data clustering data structures such as a matrix or vector. Such data clustering data structures may for instance be generated based on the set of data, the initial data cluster, the supervised data cluster, and/or a signal representative of a human analysis of comparison of the initial data cluster and the supervised data cluster.

The data clustering algorithm may then be modified at block 340 based on the comparison result. For example, where the data clustering algorithm is based on one or more data clustering parameters, the one or more data clustering parameters may be modified (block 345) based on the comparison result.

Finally, at block 350, the set of data may be processed in accordance with the modified data clustering algorithm so as to obtain a refined data cluster comprising homogeneous data.

It will be understood that the method of FIG. 3 provides a concept for improving or refining the data clustering algorithm based on human supervision and/or human analysis of the set of data. In this way, improved data clustering may be realized through extrapolating and/or inferring data clustering improvements based on the human analysis/feedback provided via block 320.

The above example of FIG. 3 is presented in the general context of a clustering algorithm for clustering a set of electronic communications. However, it will be understood that the clustering algorithm that is executed (and subsequently modified) may be any suitable data clustering algorithm that may be used to form one or more data clusters from unstructured, heterogeneous and/or intertwined data.

Figure 4:
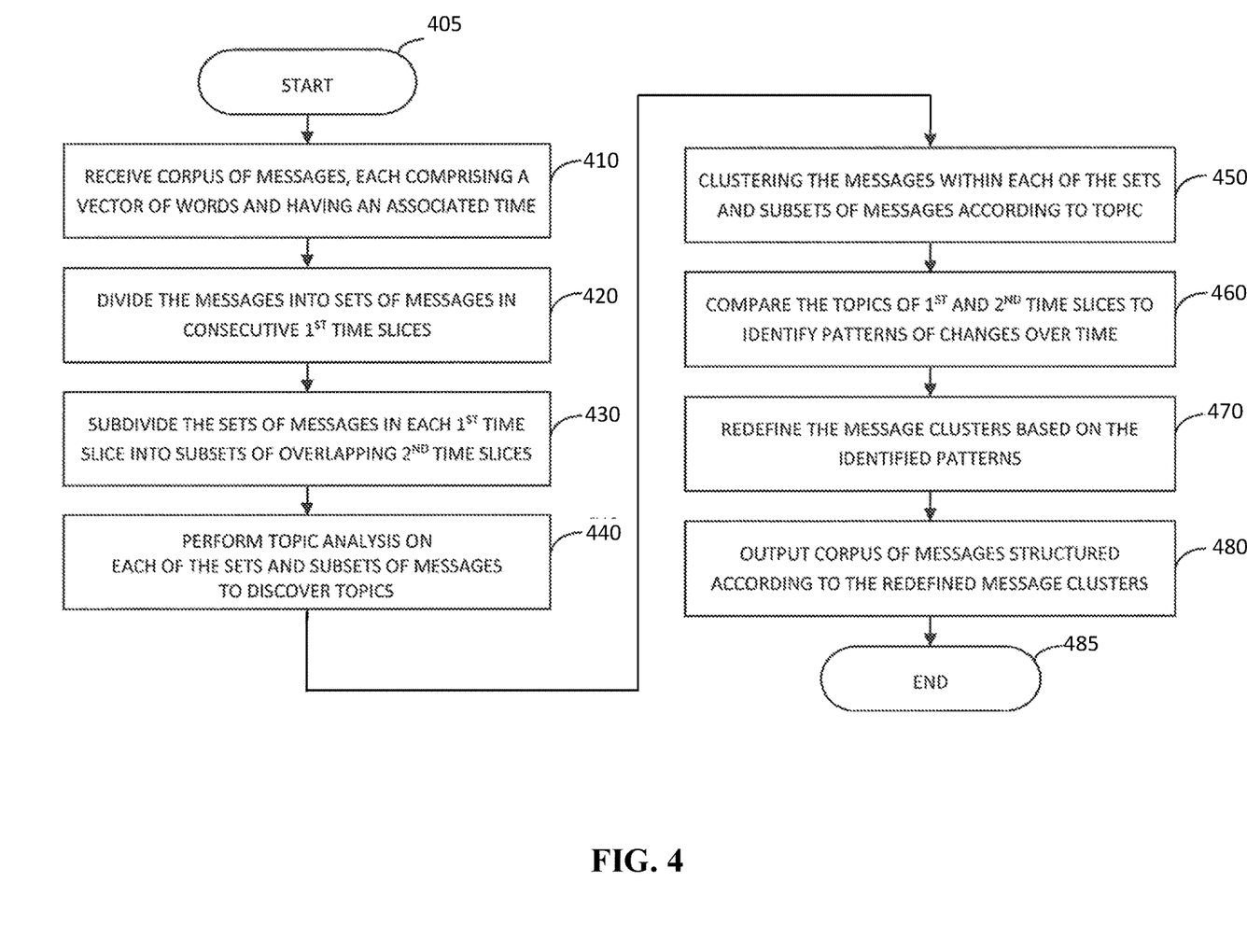
FIG. 4 depicts a method 400 for clustering of documents in accordance with example implementations.

By way of example, and simply to provide a more detailed understanding of the proposed concepts, an example algorithm that may be executed at block 310 of the FIG. 3 will now be described with reference to FIG. 4, wherein FIG. 4 is a flow diagram of a method for clustering data objects comprising messages. In particular, the following exemplary implementation concerns the analysis and clustering of messages in a chat messaging system. Each message is associated with a particular point in time (e.g., by means of a timestamp) and comprises text-based content in the form of an ordered plurality of words. Accordingly, a message may be regarded as a data object, which may be represented by a variable length vector of words, whereby the words form features or members of the data object (i.e., message). The data objects therefore comprise a set of messages, where each message may be processed by natural language processing to form a message vector of significant words in the message. Topic modeling may be used to discover the underlying topics in the set of messages, each topic having a representative set of keywords (i.e., "topic terms") that form a "topic bundle". Maximum likelihood estimation (MLE) may be used to determine the likelihood of keywords being present in a topic bundle (known as "relevancy" or "relevance"). A predefined number of topics may be identified based on the MLE scores. An example method for such topic discovery is Latent Dirichlet Allocation (LDA) topic modeling for maximum likelihood fit, as described above.

FIG. 4 depicts a method 400 for clustering of documents in accordance with example implementations. The method 400 may be performed by one or more modules, components and/or subsystems of a clustering system for structuring the documents in topic clusters or groups with increased precision for improved efficiency. In the illustrated method, the documents comprise representations of time-stamped messages of a chat messaging system, which are clustered in accordance with the method 400 based on topic or theme.

The method 400 starts at block 405. At block 410, the method receives a corpus of messages, for example from the chat messaging system. Each message is represented by a vector of words (called here "message vector") and is associated with a point in time (e.g., timestamp), as described above. The messages are typically received and processed in chronological order, but are otherwise unstructured. As the skilled person will appreciate, a raw text-based message is typically pre-processed (e.g., using a natural (language) processing engine) to form a variable length vector of words, which may be normalized to a pre-defined fixed-length vector format of O to N words, corresponding to the N most important words in the message (e.g., most frequently occurring words).

At block 420, the method divides the message vectors into consecutive first (macro) time intervals of fixed length T. Thus, block 420 produces a plurality of first (macro) time slices, each comprising a set of message vectors that are associated with points in time during the corresponding first (macro) time interval T.

At block 430, the method subdivides the first (macro) time slices T into one or more second (micro) time intervals of length t, which is less than T (i.e., t<1). In example implementations, block 430 subdivides the first (macro) time slice T into two or more overlapping second (micro) time intervals of different lengths t, whereby each second (micro) time interval is offset from a point in time (e.g., start or end) of the first (macro) time interval by a different amount of time. Thus, for each first (macro) time slice T, block 430 produces one or more second (micro) time slices t, each comprising a subset of message vectors that are associated with points in time during the corresponding second (micro) time interval t.

As the skilled person will appreciate, blocks 420 and 430 produce message samples, each comprising the set or subset of message vectors associated with the corresponding sampling time slice or interval (T or t). Each of these message samples is processed further, as described below.

At block 440, the method performs topic analysis, using each of the message samples (i.e., the set of messages in each first (macro) time slice T and the subset of messages in each second (micro) time slice t), to discover topics. Block 440 may use any suitable topic modeling or similar technique for discovering the underlying topics of the respective set or subset of messages of the message sample. For example, block 440 may analyze the messages using LDA topic modeling for maximum likelihood fit, in accordance with a predefined number of topics. The Latent Dirichlet Allocation (LDA) topic modeling, in conjunction with maximum likelihood estimation (MLE), identifies the predefined number of topics for each of the message samples, where each of the topics comprises a list of representative topic keywords (known in LDA as "term list") corresponding to the most frequently occurring words for the topic (e.g., keywords having the highest MLE scores).

At block 450, the method clusters the messages of the message samples of each first (macro) time slice T and each second (micro) time slice t according to the identified topics. In particular, block 450 may associate the messages of each of the message samples with the identified topics based on the words of the message vectors and the representative keywords of the topics. Block 450 may use any suitable technique for inferring the association of a message with one or more topics and the corresponding measure (e.g., proportion) of association of the message with an individual topic. Thus, block 450 may be considered as building a topic map or multi-layer graph that associates messages with topics for multiple overlapping (macro and micro) time slices.

At block 460, the method compares the topics, comprising topic bundles of representative keywords and associated MLE scores, produced in block 440 across different time slices (e.g., message samples) to identify patterns of changes in topics over time. In particular, block 460 may compare topics across different time slices to identify patterns of increasing or decreasing relevance of representative keywords of topics over time. For example, block 460 may compare the topics, comprising the representative topic keywords and associated MLE scores thereof, across different time slices to identify a pattern of decreasing keyword relevance in a topic over time, herein called "topic drift". Topic drift corresponds to a reduction in the likelihood of representative keywords being present in an individual topic or topic bundle over time. In particular, block 460 may compare the topics from each first (macro) time slice T with the topics from each overlapping second (micro) time slice t. Further, block 460 may compare the topics from adjacent/consecutive overlapping second (micro) time slices t within the same first (macro) time slice T. Moreover, block 460 may compare the topics from a first (macro) or second (micro) time slice with the topics from another, typically adjacent, consecutive and/or overlapping, first (macro) or second (micro) time slice. In any event, block 460 may compare topics derived by topic modeling using the message samples of different adjacent, consecutive and/or overlapping time slices by comparing the MLE scores of matching representative keywords over time, in order to determine a measure of the reduction of the MLE scores of keywords in a topic bundle over time (i.e., "topic drift").

In another example, block 460 may compare the topics, comprising the representative topic keywords and associated MLE scores thereof, produced in block 440 across different time slices to identify a pattern of increasing keyword relevance in multiple topics (i.e., topic bundles) over time, herein called "topic convergence". Topic convergence corresponds to an increase in the likelihood of the same representative keywords being present in separate topic bundles over time. Accordingly, block 460 may compare topics derived from different first (macro) time slices T and second (micro) time slices t in a variety of ways, for example as discussed above in relation to topic drift. Block 460 typically compares topics derived by topic modeling using the message samples of different consecutive, adjacent and/or overlapping time slices by comparing the MLE scores of matching representative keywords over time, in order to determine a measure of the increase of the MLE scores of keywords in topic bundles over time (i.e., "topic convergence"). Further details about topic convergence are provided below.

At block 470, the method redefines the message clusters based on the identified patterns, such as topic drift and/or topic convergence. In particular, block 470 may re-associate messages with clusters (i.e., groups of topics) and/or reorder messages within clusters based on the determined topic drift and/or topic convergence (e.g., based on identified patterns of increasing or decreasing MLE scores of representative keywords of topics over time). Block 470 may re-associate messages with clusters when topic drift and/or topic convergence is identified and according to the level of topic drift and/or topic convergence (e.g., whether the increase or decrease in MLE scores of representative keywords over time exceeds a predefined threshold indicative of "high" topic drift or "high" topic convergence, respectively). In some examples, messages associated with two or more topics that have high topic convergence may be re-associated with a single topic to form a more homogeneous message cluster. The single message cluster may be associated with a new topic or a merged topic, based on a combination of the representative keywords of each of the two or more topics. The messages in the single cluster forming a topic group are therefore more homogenous. In other example implementations, a subset of messages associated with a topic that has high topic drift may be re-associated with a separate new topic. The separate new topic may comprise representative keywords consistent with a new topic or theme. The subset of messages associated with the new topic may form a more homogeneous cluster (i.e., topic group), and, similarly, the subset of messages that remain associated with the original topic may form a more homogeneous topic group. In example implementations, for example when topic drift or topic convergence is identified at a lower level (e.g., below the abovementioned predefined threshold), messages may be reordered within a cluster based on MLE scores of representative keywords. For example, messages associated with a cluster having the same keywords with the same or similar MLE scores, and thus relating to the same theme within the relatively stable topic cluster, may be re-ordered so that messages having the same theme are closer together within a cluster, rather than moved to a separate new cluster At block 480, the method may output the corpus of messages structured in accordance with the redefined clusters provided in block 470, and thus as a structured set of topic groups for use in management and retrieval of the messages. In some embodiments, one or more selective messages from a selected topic group are output responsive to user input (e.g., responsive to a user query requesting messages relevant to a particular topic). The method ends at block 485.

As will be appreciated, the method 400 may be repeated iteratively. For example, the method may be repeated iteratively using a start time for message sampling that is offset by a time period x from the start time Y of the first iteration (where the offset x is less than T and, in some embodiments, less than t). In another example, the method may be repeated iteratively using further second (micro) time slices t' of reduced size (i.e. t'<t). Thus, message samples from subsequent iterations may overlap message samples from preceding iterations. In any event, the method may be repeated iteratively using different first (macro) time slices and/or second (micro) time slices. Such iterative repetitions may be appropriate when no patterns of topic convergence and/or topic drift are identified and/or a threshold level is not satisfied. Each iteration may be performed as part of a feedback loop, following the possible identification of topic drift and/or topic convergence and redefining of clusters, in the previous iteration. The use of feedback loops may be appropriate to achieve a desired degree of confidence in the resulting redefined clusters.

Also, as the skilled person will appreciate, block 460 involves analysis to identify patterns of changes in MLE scores (or equivalent) of topic keywords over time, which may identify topic drift (corresponding to reducing MLE scores of topic keywords over time) and/or topic convergence (corresponding to increasing MLE scores over time). Accordingly, block 460 may be divided into two separate processes, one to identify patterns of changes which represent topic drift and the other to identify patterns of changes which represent topic convergence.

Although the above description of the method of FIG. 4 has been provided so as to detail an example clustering method that may be implemented in accordance with proposed concepts, it is to be understood that embodiments need not be limited to such chat/message disentanglement. Rather, proposed concepts may be used in conjunction with any unstructured data which has a degree of heterogeneous data (e.g. data which is intertwined). Indeed, it will be understood that proposed concepts enhance data clustering (such as chat disentanglement) by providing for supervised learning methods. The supervised learning may be based on human supervision inputs, which identify errors and/or patterns in data disentanglement, that can be used to derive clustering or disentanglement structures (such as vector or matrices) for improving subsequent execution(s).

Put another way, proposed embodiments may provide a supervised learning concept that can be combined with a base clustering algorithm so as to improve the efficiency and/or accuracy of that base algorithm.

Rather than being restricted to message disentanglement, proposed embodiments may, for example, be employed in relation to unstructured text that requires classification into given types or formats. For instance, a discriminant function could be derived to determine if text is a salutation, valediction, or neither. Such a discriminant function may be (computationally or resource) expensive to execute over multiple iterations and/or corpora, so by employing the learning method proposed herein, processing time and computational resources required to classify text may be greatly reduced.

By way of providing a further example of how proposed concepts may be implemented, one may consider undertaking chat disentanglement of a chat transcript 500. Firstly, an initial chat disentanglement may be undertaken using a process as described above with reference to FIG. 4. Next, the proposed concept(s) leverage human supervision so as to allow for machine learning to occur.

Figure 5:
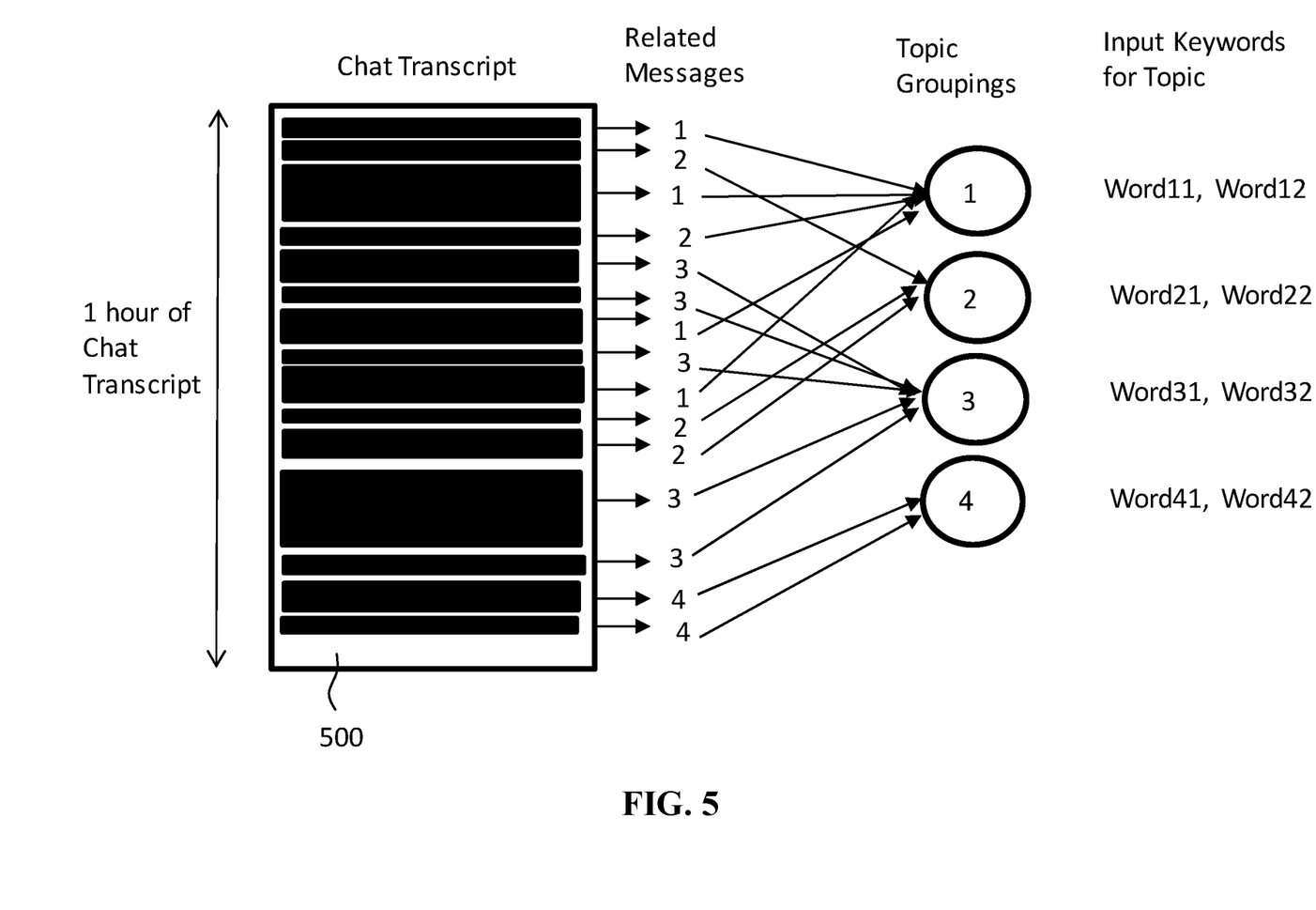
FIG. 5 is a diagram illustrating human analysis of a chat transcript in accordance with some embodiments.

More specifically, as depicted in FIG. 5, user input is received indicating human analysis of the chat transcript 500 to annotate each chat or chats that are related to each other. An input is then provided so as to define the keywords for each of the topic groupings identified related to the chat. Once the chat transcript has been annotated by a human and keywords for each grouping obtained (e.g. via user input), there is undertaken a process of delta analysis between the initial chat disentanglement (e.g., the machine results obtained using the method of FIG. 4) and the disentanglement provided via the human analysis. In this way a matrix of results may be compared against the machine results so as to determine if there is a close agreement, disagreement or inconclusive results from the process.

Further, introduction of alternate machines/algorithms to process the chat transcript may allow for an improved machine learning to occur based on comparisons with the human annotation. Variables may be altered in the machine processing, such as topic bundle count during algorithm processing, reduction or increase in the time windows that processing occurs on, and/or the comparison of nodes within each delta based on closeness to near nodes or those at the same time (leveraging existing art such as Dijkstra's algorithm).

Machine Learning may be implemented through multiple iterations of human annotation over the same transcripts along with an evolution of a machine selection based on the human input indicating that the machine-obtained results are more effective.

Accordingly, it will be appreciated that there may be provided a concept of applying supervised learning, wherein a human manually disentangles data and that disentanglement is analyzed (e.g. in terms of time and topic keywords). By comparing the manual results with machine-generated results (e.g. obtained using a conventional or existing data clustering algorithm) it may be determined how well the machine is doing. With sufficient executions and analysis, an optimal configuration for the machine may be determined so as to bring its results close to the human/supervisor. Embodiments may be deployed across contexts, for example a legal department versus a marketing department may require very different configurations due to the very different nature of the data.

In some embodiments, there is provided a system comprising a processing arrangement adapted to carry out any method previously described with reference to FIGS. 1 to 5.

Figure 6:
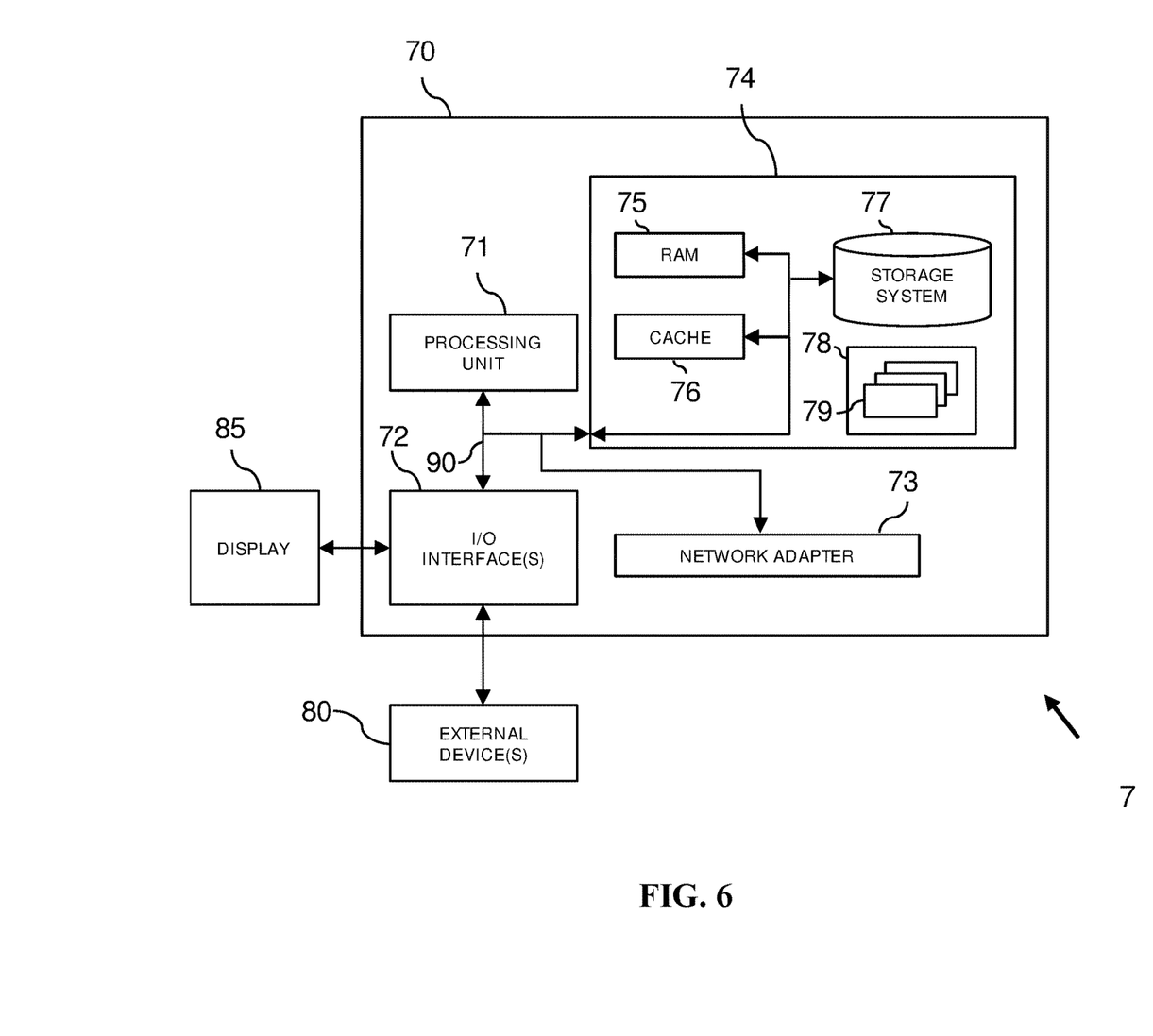
FIG. 6 illustrates a system according to some embodiments.

By way of example, as illustrated in FIG. 6, embodiments may comprise a computer system 70, which forms part of a networked system 7. The components of computer system/server 70 include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 77 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 includes at least one program product having a set (e.g., at least one) of program modules that are configured to carry out one or more of the functions described above with respect to FIGS. 1-5.

Program/utility 78, having a set (at least one) of program modules 79, is stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out one or more of the functions and/or methodologies of embodiments described herein.

Computer system/server 70 also communicates with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments constitute a method, it should be understood that such a method is a process for execution by a computer (e.g., a computer-implementable method). The various actions performed in the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data clustering, the method comprising:
   processing a set of data comprising heterogeneous data in accordance with a data clustering algorithm so as to obtain an initial data cluster comprising homogeneous data, wherein the set of data comprises a plurality of documents, wherein each document is represented by a vector of words and associated with a point in time, and wherein the processing further comprises:
   dividing the plurality of documents into data bundles;
   analyzing the data bundles to identify data similarity; and redefining the plurality of documents based on identified data similarity;
   obtaining a supervised data cluster generated based on a human analysis of the set of data;
   comparing the initial data cluster and the supervised data cluster to obtain a comparison result;
   modifying the data clustering algorithm based on the comparison result; and
   processing the set of data in accordance with the modified data clustering algorithm so as to obtain a refined data cluster comprising homogeneous data.

2. The method of claim 1, wherein the comparison result comprises at least one data clustering data structure, and wherein the at least one data clustering data structure comprises a matrix.

3. The method of claim 2, further comprising generating the at least one data clustering data structure based on the set of data.

4. The method of claim 2, further comprising generating the at least one data clustering data structure based on the initial data cluster.

5. The method of claim 2, further comprising generating the at least one data clustering data structure based on the supervised data cluster.

6. The method of claim 2, further comprising generating the at least one data clustering data structure based on a signal representative of a human analysis of comparison of the initial data cluster and the supervised data cluster.

7. The method of claim 1, wherein the data clustering algorithm is based on one or more data clustering parameters, and wherein modifying the data clustering algorithm comprises modifying the one or more data clustering parameters based on the comparison result.

8. The method of claim 1, wherein processing the set of data in accordance with a data clustering algorithm comprises:
   dividing the plurality of documents into first time slices using a first time interval to form a plurality of consecutive sets of documents;
   sub-dividing each set of documents into one or more second time slices using respective second time intervals so as to form one or more subsets of documents;
   analyzing the documents in each set of documents and each subset of documents to identify a plurality of topics, each topic represented by a set of most relevant topic keywords;
   clustering the documents in each set of documents and each subset of documents according to topic;
   comparing the topics from different sets of documents and different subsets of documents to identify patterns of changes in the relevance of topic keywords over time; and
   redefining the document clusters to form more homogenous clusters based on the identified patterns.

9. The method of claim 8, wherein sub-dividing each set of documents into one or more second time slices comprises sub-dividing each set of documents into two or more consecutive overlapping time slices.

10. The method of claim 8, wherein comparing the topics from different sets of documents and different subsets of documents to identify patterns of changes in the relevance of topic keywords over time comprises analyzing the topics from different sets of documents and different subsets of documents of overlapping time slices to identify patterns of changes in the relevance of topic keywords over time.

11. The method of claim 8, wherein comparing the topics from different sets of documents and different subsets of documents to identify patterns of changes in the relevance of topic keywords over time comprises:

determining delta differences between relevance scores of topic keywords of topics from sets of documents and subsets of documents of consecutive overlapping time slices; and using the delta differences to identify patterns of changes comprising increasing relevance of one or more topic keywords represented in multiple different topics over time, indicative of topic convergence.

12. The method of claim 8, wherein comparing the topics from different sets of documents and different subsets of documents to identify patterns of changes in the relevance of topic keywords over time comprises:

determining delta differences between relevance scores of topic keywords of topics from sets of documents and subsets of documents of consecutive overlapping time slices; and using the delta differences to identify patterns of changes comprising decreasing relevance of one or more topic keywords represented in a particular individual topic over time, indicative of topic drift.

13. The method of claim 1, wherein analyzing the data bundles comprises:

performing data analysis on the plurality of documents, the data analysis using Latent Dirichlet Allocation for maximum likelihood fit to identify a predefined number of data types, wherein each data type is represented by a set of most relevant data formats and each data format has an associated likelihood score indicative of relevance of the format.

\* \* \* \* \*